United States Patent
Bishop et al.

(10) Patent No.: US 10,735,707 B2
(45) Date of Patent: Aug. 4, 2020

(54) GENERATING THREE-DIMENSIONAL IMAGERY

(71) Applicant: International Business Machines Corporation, Armonk, NY (US)

(72) Inventors: Adam Bishop, Roanoke, VA (US); Glenn P. Crawford, Cary, NC (US); Christopher R. Florence, Cary, NC (US); Rocky D. McMahan, Wake, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 59 days.

(21) Appl. No.: 15/677,687

(22) Filed: Aug. 15, 2017

(65) Prior Publication Data

US 2019/0058857 A1 Feb. 21, 2019

(51) Int. Cl.
*H04N 13/111* (2018.01)
*H04N 13/207* (2018.01)
(Continued)

(52) U.S. Cl.
CPC ......... *H04N 13/111* (2018.05); *H04N 13/207* (2018.05); *H04N 13/246* (2018.05); *H04N 13/264* (2018.05)

(58) Field of Classification Search
CPC ............... H04N 13/261; H04N 13/139; H04N 2213/006; H04N 13/111; H04N 13/207;
(Continued)

(56) References Cited

U.S. PATENT DOCUMENTS

| 5,717,415 A | 2/1998 | Iue et al. |
| 6,108,005 A | 8/2000 | Starks |

(Continued)

FOREIGN PATENT DOCUMENTS

| CA | 2994514 A1 * | 2/2017 | ............... G06T 7/50 |
| EP | 0735512 A2 * | 10/1996 | ............... G06K 9/20 |

(Continued)

OTHER PUBLICATIONS

Saxena et al. "3-D Depth Reconstruction from a Single Still Image," International Journal of Computer Vision, Jan. 2008, vol. 76, Issue 1, 17 pages.

(Continued)

*Primary Examiner* — David E Harvey
(74) *Attorney, Agent, or Firm* — Cantor Colburn LLP; Teddi Maranzano

(57) ABSTRACT

A method includes capturing, by a camera, two-dimensional imagery. The method also includes determining, by a positioning sensor, a viewing perspective of a viewer of the two-dimensional imagery. The method also includes generating at least a first imagery based at least on the captured two-dimensional imagery and the determined viewing perspective. The method also includes displaying a three-dimensional representation of the two-dimensional imagery to the viewer. The displaying the three-dimensional representation includes displaying dual imagery, and the dual imagery includes the first imagery.

10 Claims, 6 Drawing Sheets

(51) Int. Cl.
*H04N 13/246* (2018.01)
*H04N 13/264* (2018.01)

(58) Field of Classification Search
CPC ...... H04N 13/246; H04N 13/264; G06T 7/50; G06T 15/20; G06T 2207/20092
See application file for complete search history.

(56) References Cited

U.S. PATENT DOCUMENTS

| | | | |
|---|---|---|---|
| 6,384,859 B1 | 5/2002 | Matsumoto | |
| 8,730,232 B2* | 5/2014 | Passmore | G06T 15/00 345/419 |
| 8,873,800 B2* | 10/2014 | Zhou | G06K 9/00375 348/143 |
| 8,885,025 B2 | 11/2014 | Iwabuchi | |
| 8,928,654 B2* | 1/2015 | Givon | G06T 17/00 345/419 |
| 9,007,365 B2* | 4/2015 | Sandrew | H04N 13/261 345/419 |
| 9,438,878 B2* | 9/2016 | Niebla, Jr. | H04N 13/122 |
| 9,609,307 B1* | 3/2017 | Lopez | H04N 13/261 |
| 10,121,280 B2* | 11/2018 | Peterson | G06T 15/20 |
| 10,304,191 B1* | 5/2019 | Mousavian | G06T 7/70 |
| 2003/0025995 A1 | 2/2003 | Redert | |
| 2003/0098907 A1 | 5/2003 | Naske | |
| 2008/0150945 A1* | 6/2008 | Wang | G06K 9/20 345/427 |
| 2008/0266386 A1 | 10/2008 | Maeda | |
| 2009/0116732 A1* | 5/2009 | Zhou | H04N 13/139 382/154 |
| 2009/0219383 A1 | 9/2009 | Passmore | |
| 2009/0322860 A1* | 12/2009 | Zhang | G06T 15/205 348/46 |
| 2010/0104219 A1* | 4/2010 | Limonov | H04N 13/178 382/285 |
| 2010/0111417 A1* | 5/2010 | Ward | H04N 13/261 382/173 |
| 2010/0171697 A1 | 7/2010 | Son et al. | |
| 2011/0043540 A1* | 2/2011 | Fancher | H04N 13/261 345/672 |
| 2011/0069152 A1* | 3/2011 | Wang | H04N 13/261 348/43 |
| 2011/0074925 A1* | 3/2011 | Turner | H04N 13/261 348/46 |
| 2011/0096832 A1* | 4/2011 | Zhang | G06T 7/579 375/240.08 |
| 2011/0115883 A1* | 5/2011 | Kellerman | G06F 3/012 348/46 |
| 2011/0141237 A1* | 6/2011 | Cheng | H04N 13/261 348/46 |
| 2011/0158504 A1* | 6/2011 | Turner | G06T 11/001 382/154 |
| 2011/0199460 A1 | 8/2011 | Gallagher | |
| 2011/0211045 A1* | 9/2011 | Bollano | G06T 15/20 348/46 |
| 2011/0273543 A1* | 11/2011 | Ushio | G02B 27/0172 348/54 |
| 2011/0310097 A1 | 12/2011 | Ushio | |
| 2011/0310098 A1* | 12/2011 | Kimoto | H04N 13/128 345/419 |
| 2012/0075290 A1* | 3/2012 | Kurosaki | G06T 15/00 345/419 |
| 2012/0113235 A1 | 5/2012 | Shintani | |
| 2012/0176473 A1* | 7/2012 | Genova | H04N 13/128 348/46 |
| 2012/0176477 A1* | 7/2012 | Givon | G06T 17/00 348/46 |
| 2012/0182286 A1* | 7/2012 | Wang | G06T 19/00 345/419 |
| 2012/0236118 A1 | 9/2012 | Tsai | |
| 2012/0256906 A1 | 10/2012 | Ross et al. | |
| 2012/0256909 A1 | 10/2012 | Ihara | |
| 2013/0002645 A1* | 1/2013 | Hung | H04N 13/261 345/419 |
| 2013/0009955 A1* | 1/2013 | Woo | G06T 5/005 345/419 |
| 2013/0019024 A1* | 1/2013 | Sheth | H04N 21/2381 709/231 |
| 2013/0027396 A1 | 1/2013 | Jiang | |
| 2013/0050185 A1* | 2/2013 | Xie | G06T 15/20 345/419 |
| 2013/0050445 A1 | 2/2013 | Miyake | |
| 2013/0063576 A1 | 3/2013 | Okubo | |
| 2013/0076745 A1* | 3/2013 | Kida | H04N 13/261 345/420 |
| 2013/0076746 A1* | 3/2013 | Chung | H04N 13/128 345/424 |
| 2013/0135315 A1* | 5/2013 | Bares | G06T 13/20 345/473 |
| 2013/0147911 A1 | 6/2013 | Karsch et al. | |
| 2013/0162636 A1* | 6/2013 | Kida | H04N 13/261 345/419 |
| 2013/0215237 A1 | 8/2013 | Inoue | |
| 2013/0242047 A1 | 9/2013 | Noguchi | |
| 2014/0063018 A1* | 3/2014 | Takeshita | G06T 15/08 345/427 |
| 2014/0071254 A1 | 3/2014 | Gotman | |
| 2014/0092221 A1 | 4/2014 | Nagai | |
| 2014/0362078 A1 | 12/2014 | Yamada | |
| 2015/0023589 A1 | 1/2015 | Kataoka | |
| 2015/0097927 A1* | 4/2015 | Zhao | H04N 13/271 348/43 |
| 2015/0235408 A1* | 8/2015 | Gross | G06T 15/20 345/419 |
| 2016/0171335 A1* | 6/2016 | Aguilera Perez | H04N 13/221 382/285 |
| 2017/0053422 A1* | 2/2017 | Chojnowski | G06T 7/55 |
| 2017/0140571 A1 | 5/2017 | Peterson | |
| 2017/0142392 A1 | 5/2017 | Peterson | |
| 2017/0142399 A1* | 5/2017 | Peterson | H04N 13/271 |
| 2017/0142400 A1* | 5/2017 | Peterson | H04N 13/128 |
| 2017/0244949 A1* | 8/2017 | Peterson | H04N 13/15 |
| 2017/0372165 A1* | 12/2017 | Jouhikainen | G06K 9/4609 |
| 2018/0032793 A1* | 2/2018 | Han | G06T 7/73 |
| 2018/0350134 A1* | 12/2018 | Lodato | G06T 15/20 |
| 2019/0026958 A1* | 1/2019 | Gausebeck | H04N 13/246 |

FOREIGN PATENT DOCUMENTS

| | | | | |
|---|---|---|---|---|
| EP | 2194726 A1 * | 6/2010 | | G06T 7/596 |
| EP | 2416578 A2 * | 2/2012 | | G06K 9/622 |
| EP | 2704097 A2 * | 3/2014 | | G06T 15/08 |
| JP | 10097646 A * | 4/1998 | | |
| WO | WO-2004008768 A1 * | 1/2004 | | H04N 21/2343 |
| WO | WO-2012063480 A1 * | 5/2012 | | G06K 9/00362 |
| WO | WO-2014121108 A1 * | 8/2014 | | G06T 7/571 |
| WO | WO-2017185761 A1 * | 11/2017 | | H04N 13/00 |
| WO | WO-2018185534 A1 * | 10/2018 | | G06T 7/00 |

OTHER PUBLICATIONS

Hicks et al. "Smart glasses to help the blind to see," SET for Britain, Mar. 2014, 1 page, http://www.va-st.com/wp-content/uploads/2015/05/set_for_britain_hicks_2014.pdf.

Nintendo 3DS, "What is Nintendo 3DS?," https://www.nintendo.com/3ds/what-is-nintendo-3ds (retrieved Nov. 8, 2017), 5 pages.

Shapiro, "Introduction to 3D Imaging: Perceiving 3D from 2D Images," https://courses.cs.washington.edu/courses/cse576/06sp/notes/3DIntro.ppt (retrieved Nov. 8, 2017), 2006, 22 pages.

List of IBM Patents or Patent Applications Treated as Related; Date Filed: Aug. 15, 2017, 2 pages.

Bishop et al., "Generating Three-Dimensional Imagery," U.S. Appl. No. 15/809,393, filed Nov. 10, 2017.

* cited by examiner

GENERATING THREE-DIMENSIONAL IMAGERY

BACKGROUND

The present invention relates in general to generating three-dimensional imagery. More specifically, the present invention relates to generating three-dimensional imagery based on two-dimensional imagery.

Three-dimensional imagery is media that appears to enhance a perception of depth in order to present the media in three dimensions. Three-dimensional imagery can be in the form of three-dimensional pictures or three-dimensional films. The three-dimensional imagery can be created by generating two perspectives of the imagery. The two perspectives can be displayed to a viewer in order to create the three-dimensional effect.

SUMMARY

Embodiments of the present invention are directed to a computer-implemented method for generating three-dimensional imagery. A non-limiting example of the computer-implemented method includes capturing, by a camera, two-dimensional imagery. The method also includes determining, by a positioning sensor, a viewing perspective of a viewer of the two-dimensional imagery. The method also includes generating at least a first imagery based at least on the captured two-dimensional imagery and the determined viewing perspective. The method also includes displaying a three-dimensional representation of the two-dimensional imagery to the viewer, wherein the displaying the three-dimensional representation comprises displaying dual imagery, and the dual imagery includes the first imagery.

Embodiments of the present invention are directed to a system for generating three-dimensional imagery. A non-limiting example of the system includes a memory. The system also includes a processor system communicatively coupled to the memory. The processor system is configured to perform a method including capturing two-dimensional imagery. The method also includes determining a viewing perspective of a viewer of the two-dimensional imagery. The method also includes generating at least a first imagery based at least on the captured two-dimensional imagery and the determined viewing perspective. The method also includes displaying a three-dimensional representation of the two-dimensional imagery to the viewer. The displaying the three-dimensional representation includes displaying dual imagery, and the dual imagery includes the first imagery.

Embodiments of the invention are directed to a computer program product for generating three-dimensional imagery, the computer program product including a computer readable storage medium having program instructions embodied therewith. The program instructions are executable by a processor to cause the processor to perform a method. A non-limiting example of the method includes capturing, by a camera, two-dimensional imagery. The method also includes determining, by a positioning sensor, a viewing perspective of a viewer of the two-dimensional imagery. The method also includes generating at least a first imagery based at least on the captured two-dimensional imagery and the determined viewing perspective. The method also includes displaying a three-dimensional representation of the two-dimensional imagery to the viewer. The displaying the three-dimensional representation includes displaying dual imagery, and the dual imagery includes the first imagery.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
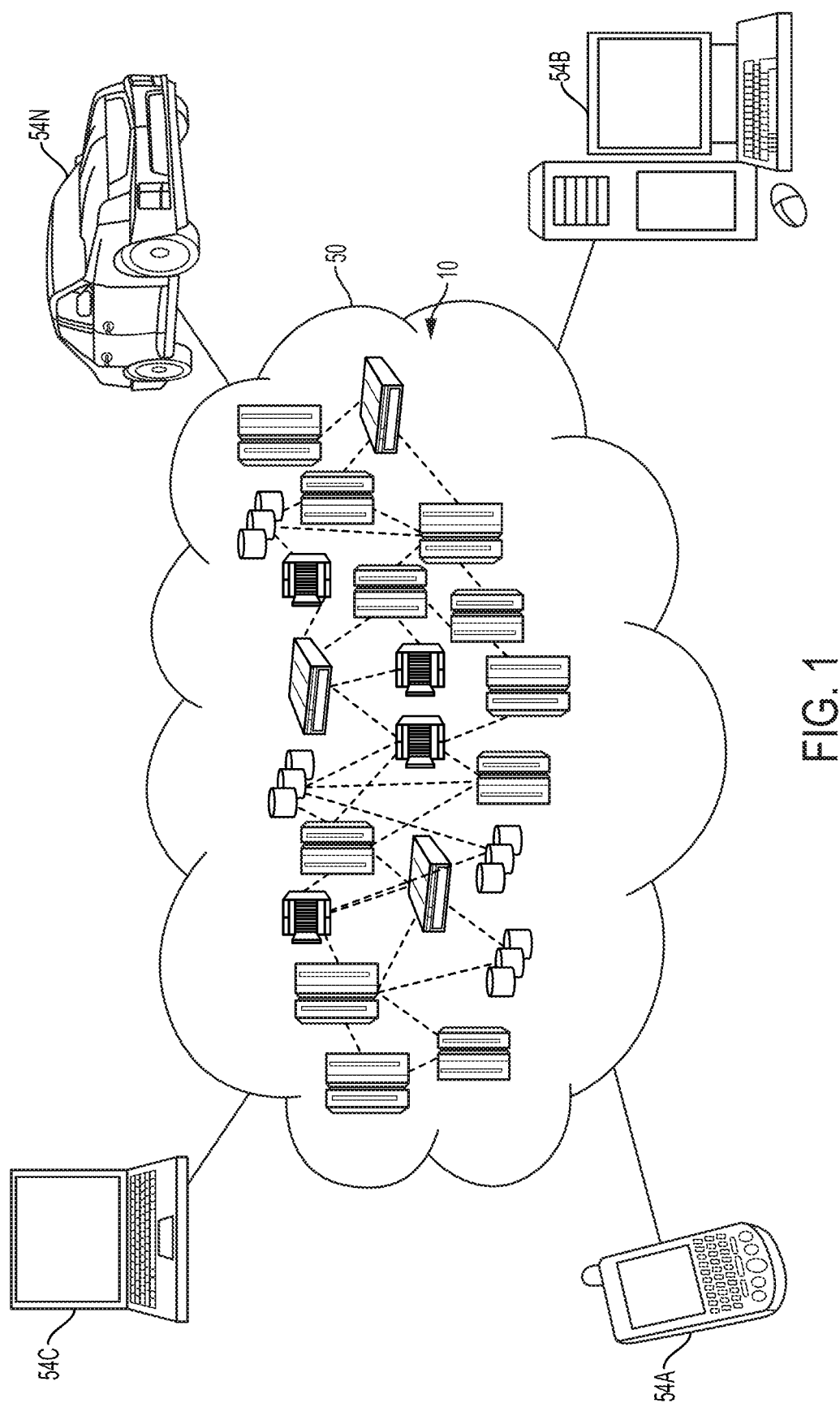
FIG. 1 depicts a cloud computing environment according to an embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
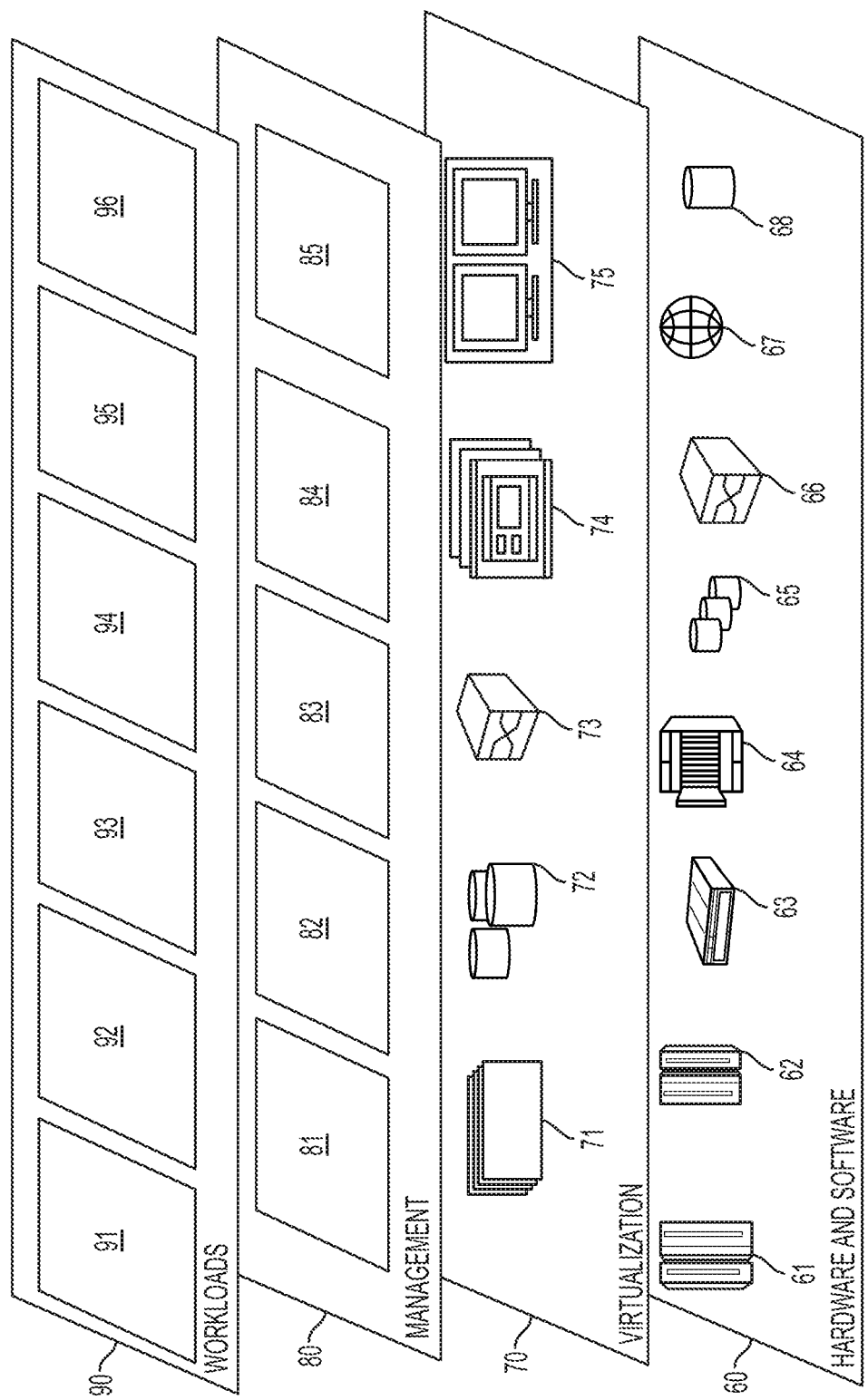
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of three-dimensional imagery 96.

Turning now to an overview of technologies that are more specifically relevant to aspects of the invention, systems that display three-dimensional imagery (such as, for example, three-dimensional motion pictures) generally use a television set along with three-dimensional shutter glasses. The television set can display a three-dimensional video by displaying alternating imagery for a left eye and for a right eye of a viewer.

The three-dimensional shutter glasses are configured to open and close each of the left and right lenses of the shutter glasses. The shutters perform the opening and the closing of the lenses such that the viewer's left eye sees only the imagery that is displayed for the left eye, and the viewer's right eye sees only the imagery that is displayed for the right eye.

With another method of displaying three-dimensional motion pictures, two projectors can superimpose left-eye imagery and right-eye imagery on a cinema screen. Each image can be projected using a different color (such as a red color or a blue color). Each lens of the three-dimensional glasses can include a different filter (such as a red filter or a blue filter) so that each eye views the correct corresponding imagery. For example, if the left lens includes the red filter, then the left lens would only let red light through to the left eye of the viewer. If the right lens includes the blue filter, then the right lens would only let blue light through to the right eye of the viewer.

Because the eyes of a viewer are spaced slightly apart, in order to display imagery in three dimensions to the viewer, slightly different images are presented to each eye of the viewer. As the viewer views the slightly different images, the viewer's brain then combines the two images together to form a single three-dimensional representation.

Although the current approaches present three-dimensional imagery to viewers, the images and films of the current approaches need to be configured beforehand to be specifically displayed as three-dimensional imagery. However, viewers may desire to view certain two-dimensional imagery as three-dimensional imagery, where the two-dimensional media has not been specifically prepared to be presented as three-dimensional imagery.

Turning now to an overview of the aspects of the invention, one or more embodiments of the invention address the above-described shortcomings of the prior art by generating three-dimensional imagery based on two-dimensional imagery.

The above-described aspects of the invention address the shortcomings of the current approaches by generating three-dimensional images or three-dimensional video from two-dimensional images or two-dimensional video in real time. For example, one or more embodiments can display three-dimensional imagery via a standard television. With this embodiment, three-dimensional glasses can use imaging technology, in conjunction with analytics, to generate two separate (dual) images from a single image that is displayed on the screen of the standard television. In addition to being displayed on the screen of the television, the imagery can also be displayed on a movie screen, on a photograph, and/or on any other two-dimensional surface.

One or more embodiments of the present invention produce dual imagery that corresponds to the imagery that would be perceived when viewing a corresponding three-dimensional representation from two different angles, which normally occurs when viewing the representation with both the left eye and the right eye of the viewer. The dual imagery would be displayed separately on the left and right lenses of three-dimensional glasses (worn by the viewer) such that the imagery seen through the glasses would simulate three-dimensional imagery.

Figure 3:
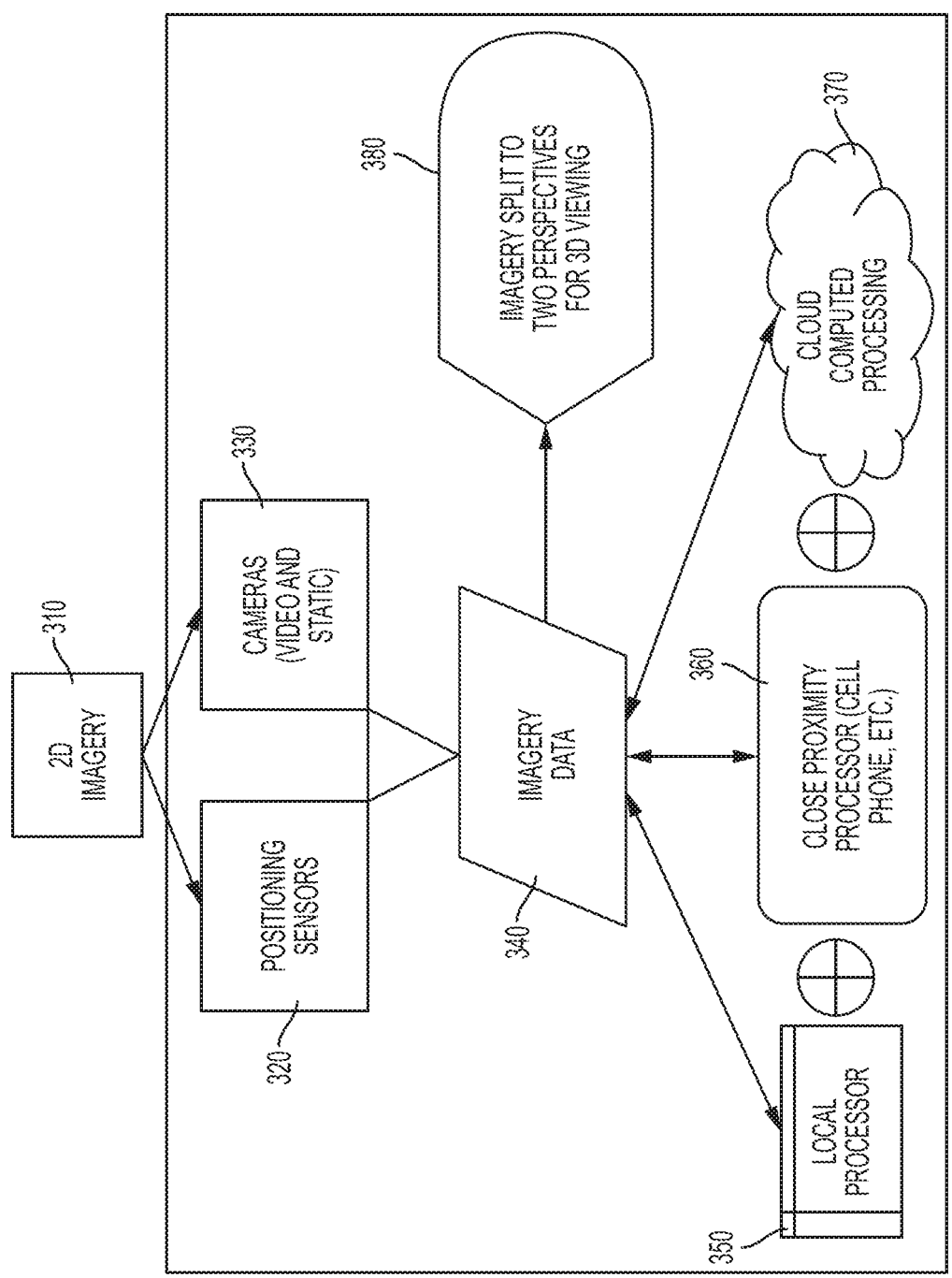
FIG. 3 depicts a system for generating three-dimensional imagery in accordance with one or more embodiments.

FIG. 3 depicts a system for generating three-dimensional imagery in accordance with one or more embodiments. In order to generate three-dimensional images or three-dimensional video in real time, one or more embodiments of the present invention can use sensors and cameras to detect and to receive two-dimensional imagery 310, as described in more detail below. One or more embodiments can then process the received imagery data.

With one or more embodiments, positioning sensors 320 can be configured to determine a distance between the viewer and the viewed imagery, and determine the angle at which the imagery 310 is being viewed by the viewer. With one or more embodiments, the positioning sensors 320 can be mounted on glasses or a headset that is being worn by the viewer. With other embodiments, positioning sensors 320 can detect the viewing distance and viewing angle while being mounted away from the viewer.

One or more embodiments include cameras 330 that are configured to capture the actual two-dimensional imagery for processing. With one or more embodiments, the cameras 330 can be mounted on glasses or a headset that is worn by the viewer in order to capture the images that the viewer actually sees. The processing of the captured imagery data 340 (such as a capturing of two-dimensional imagery 310) can be performed locally using local storage and local processors 350. The processing can also be performed via a close-proximity processor. The close-proximity processor 360 can receive the imagery data 340 (from a camera) via a short-range connection (that transmits, for example, Bluetooth™/proprietary signals). The processing can also be performed by a cloud computing system 370, as shown in FIGS. 1 and 2.

Local processor 350, close-proximity processor 360, and/or cloud computing system 370 can include a machine-learning system such as, for example, Watson™. The machine-learning system can perform imaging functionality and analytical functionality, for example. The machine-learning systems of one or more embodiments can be trained to identify different objects that appear within the two-dimensional imagery. Based on the identified objects, the trained system can generate left-eye and right-eye images. The trained system can be configured to determine the relative distances and angles between objects that are represented within the two-dimensional imagery. The trained system of one or more embodiments can determine the depths and angles that are to be used to generate the three-dimensional imagery.

One or more embodiments use captured imagery data 340 to generate imagery that is associated with captured imagery data 340. Processor 350 can be configured to recognize objects that are represented within the captured imagery data 340. Processor 350 can also determine the relative positional relationships of the represented objects, as represented within the captured imagery data 340. One or more embodiments can generate imagery, where the objects are represented within the generated imagery based on the determined viewing angles, viewing distances, and/or relative positional relationships (as reflected within the captured imagery data 340). The captured imagery data 340 and the generated imagery can be considered to be two perspectives for three-dimensional viewing of the two-dimensional imagery 310. As such, one or more embodiments perform splitting 380 of the captured imagery into two perspectives for three-dimensional viewing. The generated imagery can be similar to the originally captured imagery, except that the generated imagery is generated such that the objects within the generated imagery appear as though they are being viewed from a slightly different angle. Therefore, with one or more embodiments, the two perspectives for three-dimensional viewing can include: (1) the originally captured imagery, and (2) the generated imagery.

Other embodiments can generate both a left-eye imagery and a right-eye imagery based on the captured image data 340. The generated left-eye imagery can be similar to the originally captured image, except that the generated left-eye imagery is generated such that the objects within the generated left-eye imagery appear as though they are being viewed by a left eye of the viewer. The generated right-eye imagery can be similar to the originally captured image, except that the generated right-eye imagery is generated such that the objects within the generated right-eye imagery appear as though they are being viewed by a right eye of the viewer. Therefore, with one or more embodiments, the two perspectives for three-dimensional viewing can include: (1) the generated right-eye imagery, and (2) the generated left-eye imagery.

When one or more embodiments of the present invention determine the dual imagery of the two perspectives, the dual imagery can be displayed on a right lens and a left lens of the three-dimensional glasses, where the imagery displayed to the right eye shows a right-eye perspective, and where the imagery displayed to the left eye shows a left-eye perspective. In this way, one or more embodiments of the present invention can make two-dimensional imagery appear to be represented within three-dimensions.

One or more embodiments of the present invention can capture imagery data and can convert the captured imagery data into three-dimensional imagery and can expand the imagery to occupy the viewer's entire field of view, which can provide a more immersive experience for the viewer. By expanding the imagery to occupy the viewer's entire field of view, one or more embodiments can convert two-dimensional films into immersive three-dimensional films.

As one or more embodiments expand the imagery to occupy a space larger than the user's field of view, one or more embodiments can allow the viewer to explore within the imagery, which can enable a virtual reality experience for the viewer.

One or more embodiments of the present invention can be configured to create a more realistic and dramatic three-dimensional experience, rather than simply offsetting an angle of two different images. One or more embodiments can use algorithms to perform depth mapping, to recognize and to distinguish shading for depth versus shading for light, and/or to determine color opacity to help distinguish foreground from background.

One or more embodiments can convert a two-dimensional movie into a three-dimensional movie (where the two-dimensional movie was not originally filmed using three-dimensional technology). One or more embodiments can buffer two-dimensional video data to preemptively generate the required three-dimensional imagery to be displayed on the viewer's lenses. Such buffering of video data would negate an audio delay that would occur from processing the movie in real-time. As described above, the movie data could be locally processed, processed with the aid of short-range remote communication, and/or processed by a cloud computing system.

Figure 4:
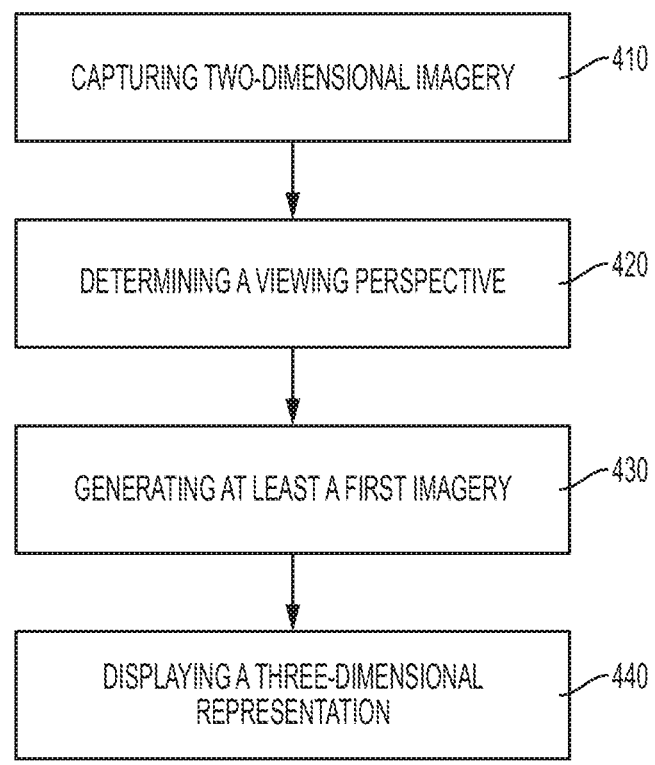
FIG. 4 depicts a flowchart of a method in accordance with one or more embodiments.

FIG. 4 depicts a flowchart of a method in accordance with one or more embodiments of the present invention. In one or more embodiments of the present invention, the method can be performed by a three-dimensional imaging system, for example. The method includes, at block 410, capturing, by a camera, two-dimensional imagery. The method also includes, at block 420, determining, by a positioning sensor, a viewing perspective of a viewer of the two-dimensional imagery. The method also includes, at block 430, generating at least a first imagery based at least on the captured two-dimensional imagery and the determined viewing perspective. The method also includes, at block 440, displaying a three-dimensional representation of the two-dimensional imagery to the viewer. The displaying the three-dimensional representation includes displaying dual imagery, and the dual imagery includes the first imagery.

Figure 5:
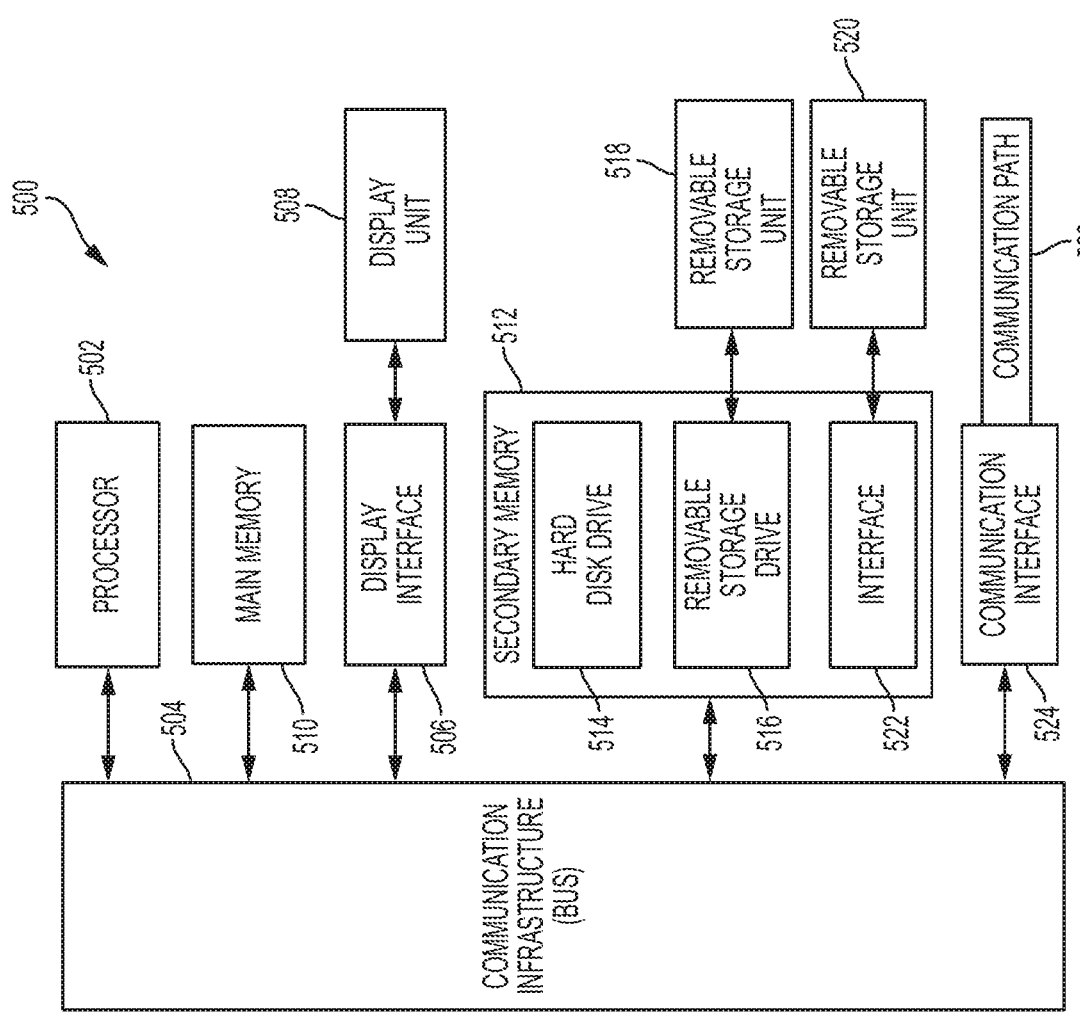
FIG. 5 depicts a high-level block diagram of a computer system, which can be used to implement one or more embodiments.

FIG. 5 depicts a high-level block diagram of a computer system 500, which can be used to implement one or more embodiments of the invention. Computer system 500 can correspond to, at least, an imaging processor, a close-proximity processor, a trained imaging processor, and/or a processor of a cloud computing system, for example. Computer system 500 can operate in conjunction with a television set. Computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512.

Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments of the invention, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via a communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the foregoing detailed description that one or more embodiments provide technical benefits and advantages.

Figure 6:
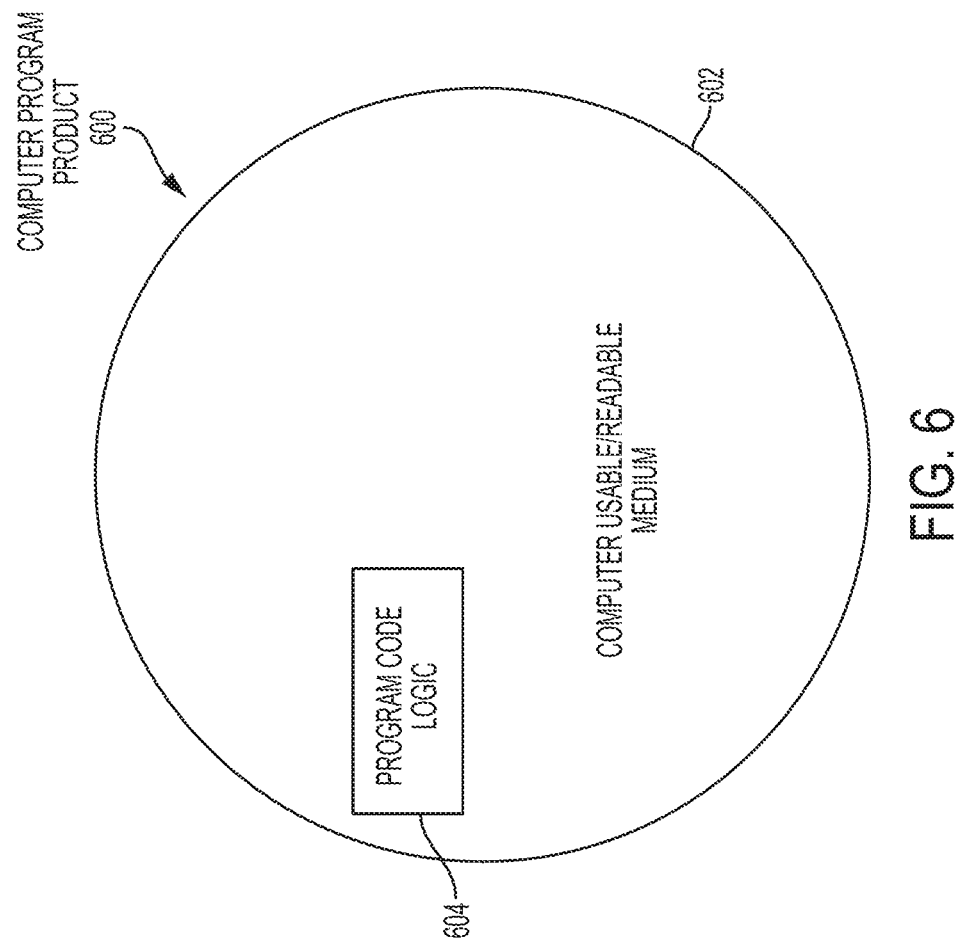
FIG. 6 depicts a computer program product, in accordance with an embodiment.

FIG. 6 depicts a computer program product 600, in accordance with an embodiment. Computer program product 600 includes a computer-readable storage medium 602 and program instructions 604.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:
1. A computer system comprising:
a memory; and
a processor system communicatively coupled to the memory;
the processor system configured to perform a method comprising:
capturing two-dimensional imagery presented on a two-dimensional surface, the capturing via a camera;
determining, via a positioning sensor, a first viewing perspective of a viewer of the two-dimensional imagery;

generating at least a first imagery based, at least in part, on the captured two-dimensional imagery and the determined first viewing perspective, wherein the generating comprises: identifying objects in the two-dimensional imagery and determining relative angles between the objects via a machine-learning system; and displaying a three-dimensional representation of the captured two-dimensional imagery to the viewer by displaying dual imagery comprising the captured two-dimensional imagery in the first viewing perspective and the generated first imagery in a second viewing perspective, wherein the first viewing perspective of the captured two-dimensional imagery and the second viewing perspective of the generated first imagery are two different perspectives combined for the three-dimensional representation.

2. The computer system of claim 1, wherein the viewing perspective comprises a distance between the viewer and the two-dimensional imagery, and an angle at which the two-dimensional imagery is being viewed by the viewer.

3. The computer system of claim 1, wherein the determining the first viewing perspective comprises determining a right-eye viewing angle, a left-eye viewing angle, and a viewing distance.

4. The computer system of claim 3, wherein the processor system is further configured to generate a second imagery based at least on the captured two-dimensional imagery, wherein the generating the first imagery and the second imagery is based on the right-eye viewing angle, the left-eye viewing angle, and the viewing distance.

5. The computer system of claim 4, wherein the displaying the dual imagery comprises displaying the first imagery and the second imagery.

6. A computer-readable storage device having program instructions embodied therewith, the program instructions readable by a processor system to cause the processor system to perform a method comprising:

capturing, by via a camera, two-dimensional imagery presented on a two-dimensional surface;

determining, by the processor system via a positioning sensor, a first viewing perspective of a viewer of the two-dimensional imagery;

generating, by the processor system, at least a first imagery based, at least in part, on the captured two-dimensional imagery and the determined first viewing perspective, wherein the generating comprises: identifying objects in the two-dimensional imagery and determining relative angles between the objects via a machine-learning system; and displaying a three-dimensional representation of the two-dimensional imagery to the viewer by displaying dual imagery comprising the captured two-dimensional imagery in the first viewing perspective and the generated first imagery in a second viewing perspective, wherein the first viewing perspective of the captured two-dimensional imagery and the second viewing perspective of the generated first imagery are two different perspectives combined for the three-dimensional representation.

7. The computer-readable storage device of claim 6, wherein the viewing perspective comprises a distance between the viewer and the two-dimensional imagery, and an angle at which the two-dimensional imagery is being viewed by the viewer.

8. The computer-readable storage device of claim 6, wherein the determining the first viewing perspective comprises determining a right-eye viewing angle, a left-eye viewing angle, and a viewing distance.

9. The computer-readable storage device of claim 8, wherein the method further comprises generating a second imagery based at least on the captured two-dimensional imagery, wherein the generating the first imagery and the second imagery is based on the right-eye viewing angle, the left-eye viewing angle, and the viewing distance.

10. The computer-readable storage device of claim 9, wherein the displaying the dual imagery comprises displaying the first imagery and the second imagery.

* * * * *